(12) United States Patent
Wake et al.

(10) Patent No.: US 12,317,769 B2
(45) Date of Patent: Jun. 3, 2025

(54) INDUSTRIAL MACHINERY SYSTEM, INDUSTRIAL MACHINE, CONTROL APPARATUS, CONTROL METHOD FOR INDUSTRIAL MACHINERY SYSTEM, AND CONTROL PROGRAM FOR INDUSTRIAL MACHINERY SYSTEM

(71) Applicant: NILEWORKS INC., Tokyo (JP)

(72) Inventors: Chihiro Wake, Tokyo (JP); Hiroshi Yanagishita, Tokyo (JP); Yutaka Murakumo, Tokyo (JP)

(73) Assignee: NILEWORKS INC., Tokyo (JP)

( * ) Notice: Subject to any disclaimer, the term of this patent is extended or adjusted under 35 U.S.C. 154(b) by 108 days.

(21) Appl. No.: 17/603,974

(22) PCT Filed: May 20, 2020

(86) PCT No.: PCT/JP2020/019925
§ 371 (c)(1),
(2) Date: Oct. 15, 2021

(87) PCT Pub. No.: WO2020/241411
PCT Pub. Date: Dec. 3, 2020

(65) Prior Publication Data
US 2022/0201922 A1 Jun. 30, 2022

(30) Foreign Application Priority Data
May 24, 2019 (JP) .................................. 2019-097459

(51) Int. Cl.
A01B 69/04 (2006.01)
A01C 21/00 (2006.01)
(Continued)

(52) U.S. Cl.
CPC ............ *A01B 69/008* (2013.01); *B64U 10/13* (2023.01); *B64U 30/26* (2023.01); *G05D 1/101* (2013.01);
(Continued)

(58) Field of Classification Search
CPC ................................................... A01B 69/008
See application file for complete search history.

(56) References Cited

U.S. PATENT DOCUMENTS 10,165,722 B2 * 1/2019 Ackerman ........... G05D 1/0274
10,319,245 B2    6/2019 Tabuchi
(Continued)

FOREIGN PATENT DOCUMENTS

AU    2018320964 A1 * 3/2020   ........... G05D 1/0246
JP    2001-120151 A    5/2001
(Continued)

OTHER PUBLICATIONS

International Search Report of PCT/JP2020/019925 dated Aug. 18, 2020.

*Primary Examiner* — Jean Paul Cass
(74) *Attorney, Agent, or Firm* — MATTINGLY & MALUR, PC

(57) ABSTRACT

There is provided an industrial machinery system including an industrial machine, an area information acquiring device that acquires information on an operation area where the industrial machine is to be caused to perform an operation, and a control apparatus that determines whether to perform the operation by the industrial machine in the operation area, wherein the control apparatus includes a storage section that stores information on a registered area, the information being acquired in advance, and a determining section that determines whether to perform the operation by the industrial machine in accordance with whether an area corre- (Continued)

sponding to the operation area is identifiable from the registered area stored in the storage section.

22 Claims, 14 Drawing Sheets

(51) Int. Cl.
*A01M 7/00* (2006.01)
*A01M 9/00* (2006.01)
*B64D 1/18* (2006.01)
*B64U 10/13* (2023.01)
*B64U 30/26* (2023.01)
*B64U 101/30* (2023.01)
*B64U 101/40* (2023.01)
*B64U 101/45* (2023.01)
*G05D 1/00* (2024.01)

(52) U.S. Cl.
CPC .......... *A01C 21/007* (2013.01); *A01M 7/0089* (2013.01); *A01M 9/0092* (2013.01); *B64D 1/18* (2013.01); *B64U 2101/30* (2023.01); *B64U 2101/40* (2023.01); *B64U 2101/45* (2023.01)

(56) References Cited

U.S. PATENT DOCUMENTS

| | | | | |
|---|---|---|---|---|
| 11,483,958 B2* | 11/2022 | Wallach | ............... | G05D 1/0278 |
| 11,595,618 B2* | 2/2023 | Krone | ............... | E02F 9/261 |
| 11,617,363 B2* | 4/2023 | Hauck, Jr. | ............... | G05D 1/02 |
| | | | | 119/712 |
| 2004/0035107 A1* | 2/2004 | Letovsky | ............... | B60L 8/00 |
| | | | | 60/527 |
| 2013/0318400 A1* | 11/2013 | Liang | ............... | G06F 11/26 |
| | | | | 714/32 |
| 2016/0157414 A1* | 6/2016 | Ackerman | ............... | G01S 5/16 |
| | | | | 701/25 |
| 2017/0285628 A1* | 10/2017 | Erhart | ............... | B25J 13/006 |
| 2018/0222582 A1 | 8/2018 | Ohata et al. | | |
| 2019/0146474 A1* | 5/2019 | Cella | ............... | G06N 3/044 |
| | | | | 702/188 |

FOREIGN PATENT DOCUMENTS

| | | |
|---|---|---|
| JP | 2008-105591 A | 5/2008 |
| JP | 2017-163265 A | 9/2017 |
| WO | 2017/017984 A1 | 2/2017 |
| WO | 2017/115807 A1 | 7/2017 |

* cited by examiner

Fig. 11

| OPERATION AREA ID | COORDINATES | OPERATION TYPE | DIRECTOR ID | DRONE ID | DATE OF ACQUISITION |
|---|---|---|---|---|---|
| 1 | (39.9,134.9,20), (40,134.9,21), (40,135.1,20), (39.9,135.1,19) | SPREADING CHEMICAL AGENT - AGROCHEMICAL A | 101 | 201 | Apr. 1, 2019 |

| FLIGHT PERMITTED AREA ID | COORDINATES | AREA TYPE | DIRECTOR ID | DRONE ID | DATE OF FINAL UPDATE |
|---|---|---|---|---|---|
| 1 | (40,135.0,20), (40.1,135.0,21), (40.1,135.1,20), (40,135.1,19) | RICE FIELD - AGROCHEMICAL PERMITTED | 101 | 201 | Apr. 1, 2019 |
| 2 | | RICE FIELD - AGROCHEMICAL NOT PERMITTED | 101 | 201 | Apr. 1, 2019 |
| 3 | | FIELD - AGROCHEMICAL PERMITTED | 102 | 202, 203 | Apr. 1, 2018 |
| 4 | | FIELD - REDUCED AMOUNT OF AGROCHEMICAL | 102 | 202, 203 | Apr. 1, 2018 |
| 5 | | FIELD - AGROCHEMICAL NOT PERMITTED | 103 | 202, 203 | Apr. 1, 2017 |

(b)

| OPERATION AREA ID | COORDINATES | OPERATION TYPE | DIRECTOR ID | DRONE ID | DATE OF FINAL UPDATE |
|---|---|---|---|---|---|
| 1 | (39.9,134.9,20), (40,134.9,21), (40,135.1,20), (39.9,135.1,19) | SPREADING CHEMICAL AGENT - AGROCHEMICAL A | 101 | 201 | Apr. 1, 2019 |
| 2 | | SPREADING CHEMICAL AGENT - AGROCHEMICAL B | 101 | 201 | Apr. 1, 2018 |
| 3 | | MONITORING PLANT GROWTH | 102 | 202 | Apr. 1, 2017 |

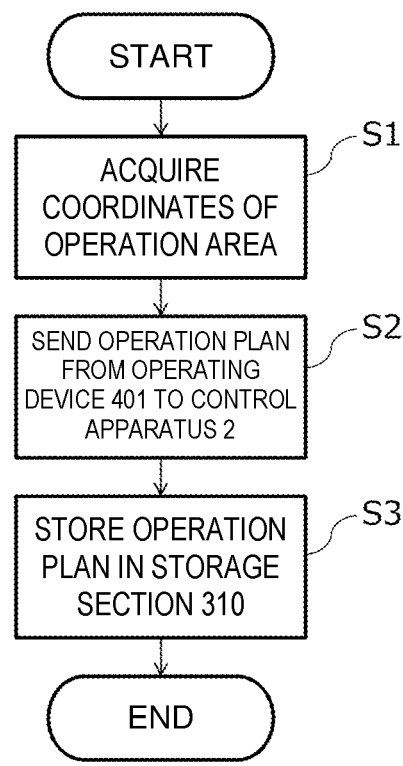

INDUSTRIAL MACHINERY SYSTEM, INDUSTRIAL MACHINE, CONTROL APPARATUS, CONTROL METHOD FOR INDUSTRIAL MACHINERY SYSTEM, AND CONTROL PROGRAM FOR INDUSTRIAL MACHINERY SYSTEM

TECHNICAL FIELD

The invention of the present application relates to an industrial machinery system, an industrial machine, a control apparatus, a control method for an industrial machinery system, and a control program for an industrial machinery system.

BACKGROUND ART

Application of small helicopters (multicopters) generally called drones has progressed. One of important fields of the application is spreading chemical agent, such as agrochemical and liquid fertilizer, over farmland (an agricultural field) (e.g., see Patent Literatures 1 and 2). For relatively narrow farmland, using a drone rather than a piloted airplane or helicopter is often suitable.

If a zone out of an agricultural field possessed by an operator or a no-fly area is specified as a fly area, chemical agent is spread out of the agricultural field to be subject to spreading of the chemical agent by the drone, which is hazardous. In addition, there is a risk that an inappropriate operator may specify a zone out of the agricultural field for a drone to fly with intention of misusing the drone. Moreover, if a flight of a done is started although obstacles such as trees and utility poles are placed in a specified fly area, there is a risk of collision and crash.

Hence, there is a need for an industrial machinery system that determines whether to perform an operation by an agricultural machine before the operation so as to guarantee a safe operation.

Patent Literature 3 discloses a flight management method for an autonomous control unmanned aerial vehicle, in which a flight authentication server is provided with a flight safety zone database that includes flight safety zones in a lattice pattern on a digitized map, and in a case where a requested flight route is out of the flight safety zones, the flight on the flight route is not permitted. A flight plan included in a flight request is specified by inputting flight points including flight waypoints and a flight destination point in a form of data items each including a latitude, a longitude, an altitude, a direction, and the like.

Patent Literature 4 describes an aerial vehicle control apparatus that manages airspaces of different limits on flight conditions and controls an aerial vehicle so that the aerial vehicle does not enter a prohibited airspace and a no-fly zone. The aerial vehicle control apparatus acquires a place of departure and a destination of the aerial vehicle and specifies a flight route that avoids the no-fly zone. A flight plan is specified in a form of bounds each constituted of a latitude and a longitude.

CITATION LIST

Patent Literature

[Patent Literature 1] Japanese Patent Laid-Open No. 2001-120151
[Patent Literature 2] Japanese Patent Laid-Open No. 2017-163265
[Patent Literature 3] Japanese Patent Laid-Open No. 2008-105591
[Patent Literature 4] International Publication No. WO2017/115807

SUMMARY OF INVENTION

Technical Problem

An objective of the present invention is to provide an industrial machinery system that guarantees a safe operation of an industrial machine before the operation.

Solution to Problem

An industrial machinery system according to an aspect of the present invention to achieve the objective described above is an industrial machinery system including an industrial machine, an area information acquiring device that acquires information on an operation area where the industrial machine is to be caused to perform an operation, and a control apparatus that determines whether to perform the operation by the industrial machine in the operation area, wherein the control apparatus includes a storage section that stores information on a registered area, the information being acquired in advance, and a determining section that determines whether to perform the operation by the industrial machine in the operation area in accordance with whether an area corresponding to the operation area is identifiable from the registered area stored in the storage section.

The determining section may inhibit the operation by the industrial machine in the operation area in a case where an area corresponding to the operation area is unidentifiable from the registered area stored in the storage section.

The industrial machinery system may further include an operating device with which the industrial machine is operated, and in a case where the determining section determines that an area corresponding to the operation area is unidentifiable from the registered area stored in the storage section, the operating device may make a notification about information concerning a result of the determination.

The area information acquiring device may be a measuring device that acquires, as the information on the operation area, position coordinates of the operation area or a position coordinate acquiring device that is mounted in the industrial machine or the operating device for the industrial machine and acquires, as the information on the operation area, position coordinates of a vicinity of the operation area, information on the registered area stored in the storage section may include position coordinates of the registered area, and the determining section may compare the position coordinates of the operation area with the position coordinates of the registered area to identify an area corresponding to the operation area from the registered area, when determining that there is an area corresponding to the operation area in the registered area, the determining section may permit the operation by the industrial machine, and when determining that there is no area corresponding to the operation area in the registered area, the determining section may inhibit the operation by the industrial machine.

The registered area stored in the storage section may include a plurality of pieces of area information, and the determining section may identify an area corresponding to the operation area from the plurality of pieces of area information stored as the registered area.

The storage section may store identification information on the registered area and a representative point that represents the registered area in association with each other, and the determining section may specify one predetermined point that is determined based on the information on the operation area and may select a registered area that minimizes a distance between the predetermined point and the representative point as the area corresponding to the operation area.

The predetermined point may be a center of a polygon that is defined by connecting vertices of the operation area.

In a case where an overlapping ratio between the operation area and the registered area corresponding to the operation area is not less than a predetermined value, the determining section may permit the operation by the industrial machine in the operation area.

In a case where a difference between an area of the operation area and an area of the registered area corresponding to the operation area is within a predetermined value, the determining section may permit the operation by the industrial machine in the operation area.

The determining section may change a threshold value for determining whether to perform the operation based on the overlapping ratio between the operation area and the registered area corresponding to the operation area, in accordance with the area of the registered area corresponding to the operation area.

In a case where sets of position coordinates of a plurality of vertices included in an outer circumference of the operation area that demarcates the operation area are within a predetermined range from a set of position coordinates of a vertex included in an outer circumference of an area corresponding to the operation area, the determining section may permit the operation by the industrial machine in the operation area.

In a case where any one of the number of a plurality of edges, sets of position coordinates of the edges, angles of adjacent edges, and the number of vertices included in the outer circumference of the operation area that demarcates the operation area is within a predetermined range from corresponding one of the number of edges, sets of position coordinates of the edges, angles of adjacent edges, and the number of vertices included in an outer circumference of an area corresponding to the operation area, the determining section may permit the operation by the industrial machine in the operation area.

The control apparatus may further include a reception section that receives a purpose of the operation by the industrial machine, the storage section may store identification information on the agricultural field and a feasible operation type that is associated with the identification information on the registered area, and the determining section may permit the operation by the industrial machine in the operation area in a case where an operation type of the industrial machine received by the reception section matches an operation type that is feasible in the registered area corresponding to the operation area.

The control apparatus may further include a reception section that receives identification information on the industrial machine, the storage section may store identification information on the agricultural field and identification information on the industrial machine that is associated with the identification information on the registered area and determined to be operable, and the determining section may permit the operation by the industrial machine in the operation area in a case where the identification information on the industrial machine received by the reception section matches identification information on an industrial machine that is operable in the registered area corresponding to the operation area.

The storage section may be capable of updating the registered area based on data received from an external server and compare the data from the external server with the registered area stored in the storage section to determine whether there is an update history, and in a case where the update history is present, the storage section may inhibit the operation by the industrial machine until updating the registered area is completed, may update the registered area, or may notify the operating device for the industrial machine of a result of the determination.

The storage section may store a date and time of acquisition of information on an area corresponding to the operation area, and in a case where a date and time of acquisition of information on the agricultural field stored in the storage section is separated from a date and time of start of the operation by the industrial machine by a predetermined value, the determining section may not permit the operation by the industrial machine.

The storage section may store a date and time of acquisition of information on the operation area, and in a case where a date and time of acquisition of the operation area is separated from a date and time of flight of the industrial machine by a predetermined value, the determining section may not permit the operation by the industrial machine or may notify a user.

An industrial machinery system according to another aspect of the present invention to achieve the objective described above is an industrial machinery system including an industrial machine that performs an operation in a predetermined operation area, and a control apparatus that determines whether to perform the operation by the industrial machine in the operation area, wherein the control apparatus includes a storage section that stores information on a registered area, the information being acquired in advance, and a determining section that determines whether to perform the operation by the industrial machine in the operation area by comparing information on the operation area acquired by the industrial machine or another industrial machine performing a preliminary movement of which movement is performed in a mode different from a mode of the operation with information on the registered area stored in the storage section.

In the preliminary movement, the industrial machine may move along a boundary of the operation area and check whether to perform the operation in the operation area.

In the preliminary movement, the industrial machine may check for an obstacle in the operation area.

Information on a periphery of the operation area may be acquired by the preliminary movement of the industrial machine, and the determining section may check for an obstacle based on the information acquired by the preliminary movement.

In the preliminary movement, the industrial machine may move at a speed lower than a speed at which the industrial machine moves in the operation.

The industrial machine may be a drone.

The industrial machine may be an agricultural machine.

A control method for an industrial machinery system according to still another aspect of the present invention to achieve the objective described above is a control method for an industrial machinery system including an industrial machine, an area information acquiring device that acquires information on an operation area where the industrial machine is to be caused to perform an operation, and a control apparatus that determines whether to perform the operation by the industrial machine in the operation area, the control method including a storing step of storing information on a registered area, the information being acquired in advance, and a determining step of determining whether to perform the operation by the industrial machine in the operation area in accordance with whether an area corresponding to the operation area is identifiable from the registered area stored in the storage section.

A control program for an industrial machinery system according to still another aspect of the present invention to achieve the objective described above is a control program for an industrial machinery system including an industrial machine, an area information acquiring device that acquires information on an operation area where the industrial machine is to be caused to perform an operation, and a control apparatus that determines whether to perform the operation by the industrial machine in the operation area, the control program causing a computer to execute a storing command to store information on a registered area, the information being acquired in advance, and a determining command to determine whether to perform the operation by the industrial machine in the operation area in accordance with whether an area corresponding to the operation area is identifiable from the registered area stored in the storage section.

An industrial machine according to still another aspect of the present invention to achieve the objective described above is an industrial machine that is capable of being communicatively connected to an area information acquiring device that acquires information on an operation area where the industrial machine is to be caused to perform an operation and to a control apparatus that determines whether to perform the operation by the industrial machine in the operation area, wherein the industrial machine receives information on whether to perform the operation by the industrial machine from the control apparatus, the information being determined in accordance with whether an area corresponding to the operation area is identifiable from information on a registered area that is acquired in advance.

A control apparatus according to still another aspect of the present invention to achieve the objective described above is a control apparatus that is capable of being communicatively connected to an industrial machine and an area information acquiring device that acquires information on an operation area where the industrial machine is to be caused to perform an operation, wherein the control apparatus includes a storage section that stores information on a registered area, the information being acquired in advance, and a determining section that determines whether to perform the operation by the industrial machine in the operation area in accordance with whether an area corresponding to the operation area is identifiable from the registered area stored in the storage section.

Note that the computer program can be provided by download over a network such as the Internet or may be provided being recorded in one of various kinds of computer-readable recording media such as a CD-ROM.

Advantageous Effect of Invention

It is possible to guarantee a safe operation of an industrial machine before the operation.

BRIEF DESCRIPTION OF DRAWINGS

FIG. 11 illustrates an example of a table showing information on an operation plan.
FIG. 12 illustrates an example of tables that are stored in a storage section included in the control apparatus and include (a) a table showing information concerning agricultural fields stored in a whitelist and (b) a table showing information concerning operation plans.
FIG. 13 is a flowchart of how the drone system acquires an operation plan.

DESCRIPTION OF EMBODIMENTS

Embodiments for carrying out the invention of the present application will be described below with reference to the drawings. The drawings are all for exemplification purposes. In a detailed description to be made below, specific details will be described for explanation and for aiding complete understanding of disclosed embodiments. However, the embodiments are not limited to these specific details. In addition, well-known structures and devices are illustrated schematically for simplification of the drawings.

First, a configuration of a drone included in an industrial machinery system according to the present invention will be described. The industrial machine is, for example, an agricultural machine, and the drone is an example of the agricultural machine. In the present specification, the drone generally refers to an aerial vehicle including a plurality of rotary wings irrespective of its type of motive power (electric motor, heat engine, etc.) and its type of control (wireless or wired, autonomous flight or manual control, etc.)

As illustrated in FIG. 1 to FIG. 5, rotary wings 101-1a, 101-1b, 101-2a, 101-2b, 101-3a, 101-3b, 101-4a, and 101-4b (also referred to as rotors) are means for causing a drone 100 to fly, and eight rotary wings (four sets of double-tier rotary wings) are provided, with consideration given to balance of stability of flight, a size of an airframe, and power consumption. The rotary wings 101 are arranged at positions in four directions from a main body 110 of the drone 100, supported by arms extending from the main body 110. That is, as viewed in a traveling direction of the drone 100, the rotary wings 101-1a and 101-1b are arranged behind the main body 110 on the left, the rotary wings 101-2a and 101-2b are arranged ahead of the main body 110 on the left, the rotary wings 101-3a and 101-3b are arranged behind the main body 110 on the right, and the rotary wings 101-4a and 101-4b are arranged ahead of the main body 110 on the right. Note that a traveling direction of the drone 100 is a downward direction of the paper of FIG. 1. Below the rotary wings 101, rod-shaped legs 107-1, 107-2, 107-3, and 107-4 extend along rotation axes of the rotary wings 101.

Figure 1:
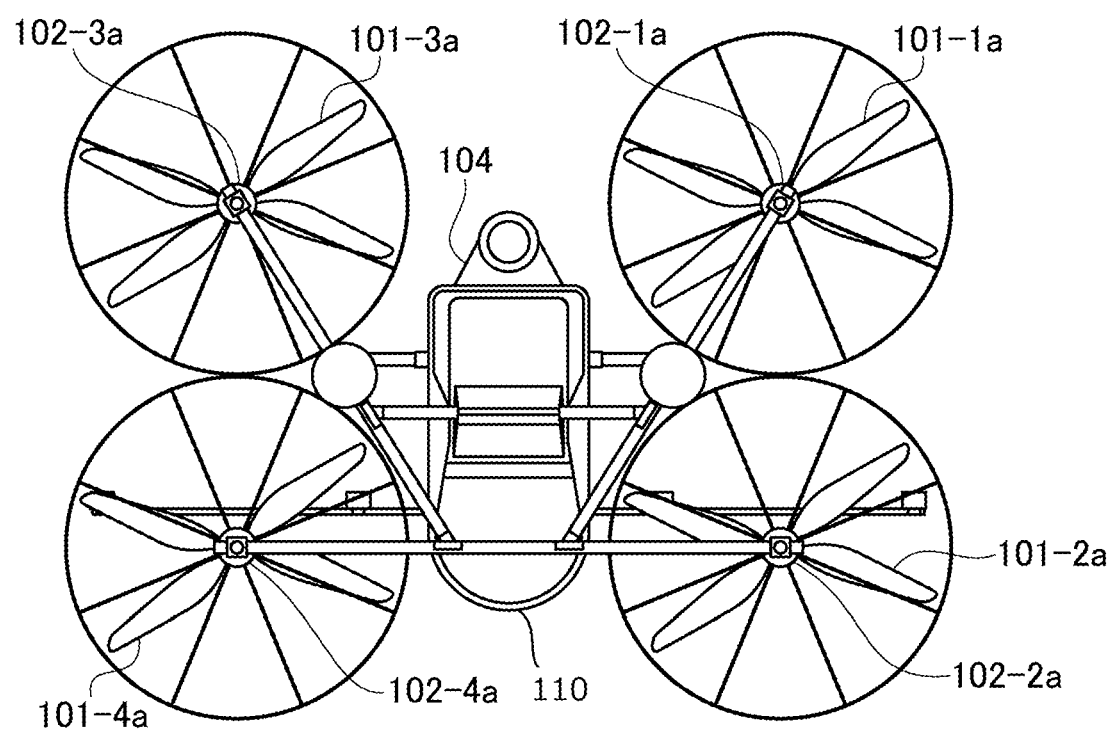
FIG. 1 is a plan view of a drone included in a drone system that is an example of an industrial machinery system according to the invention of the present application.
Figure 2:
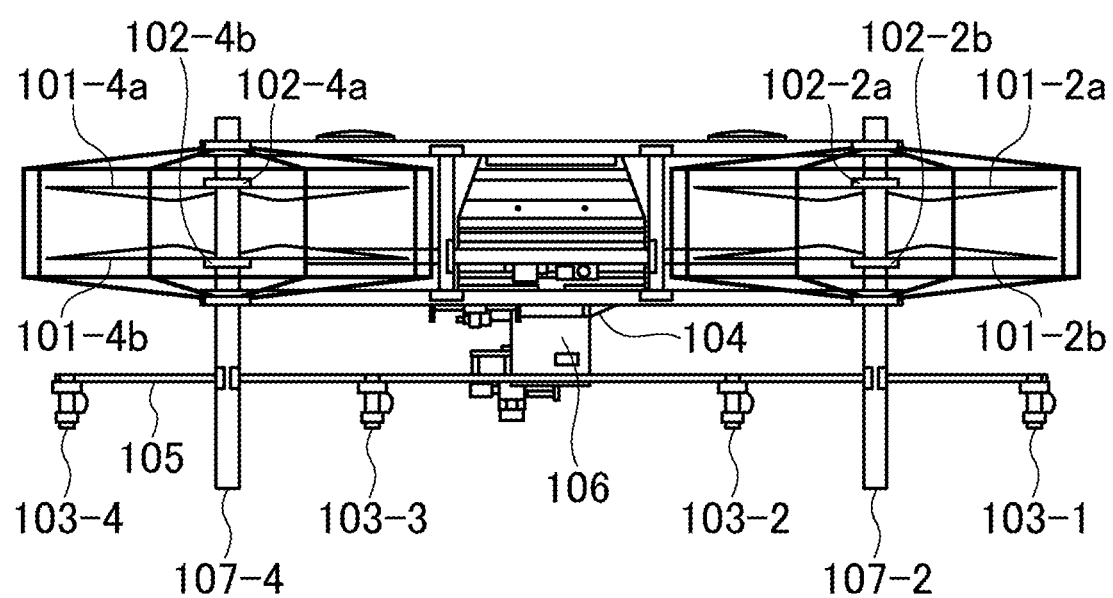
FIG. 2 is a front view of the drone.
Figure 3:
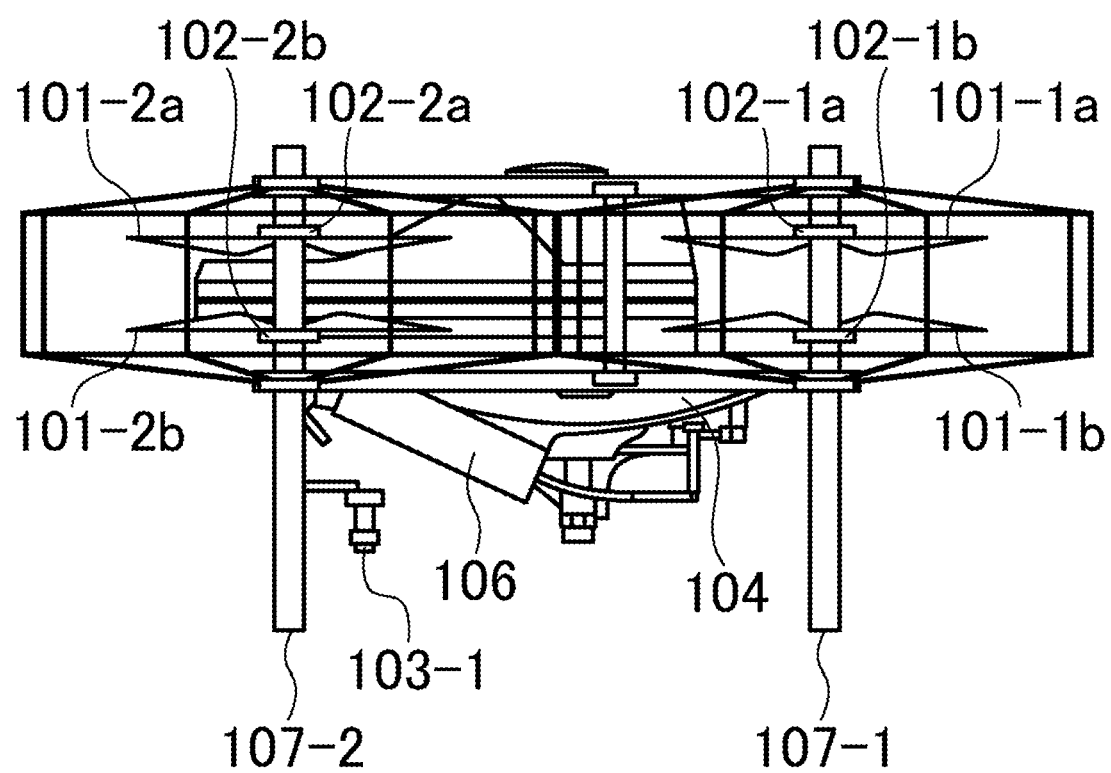
FIG. 3 is a right side view of the drone.
Figure 4:
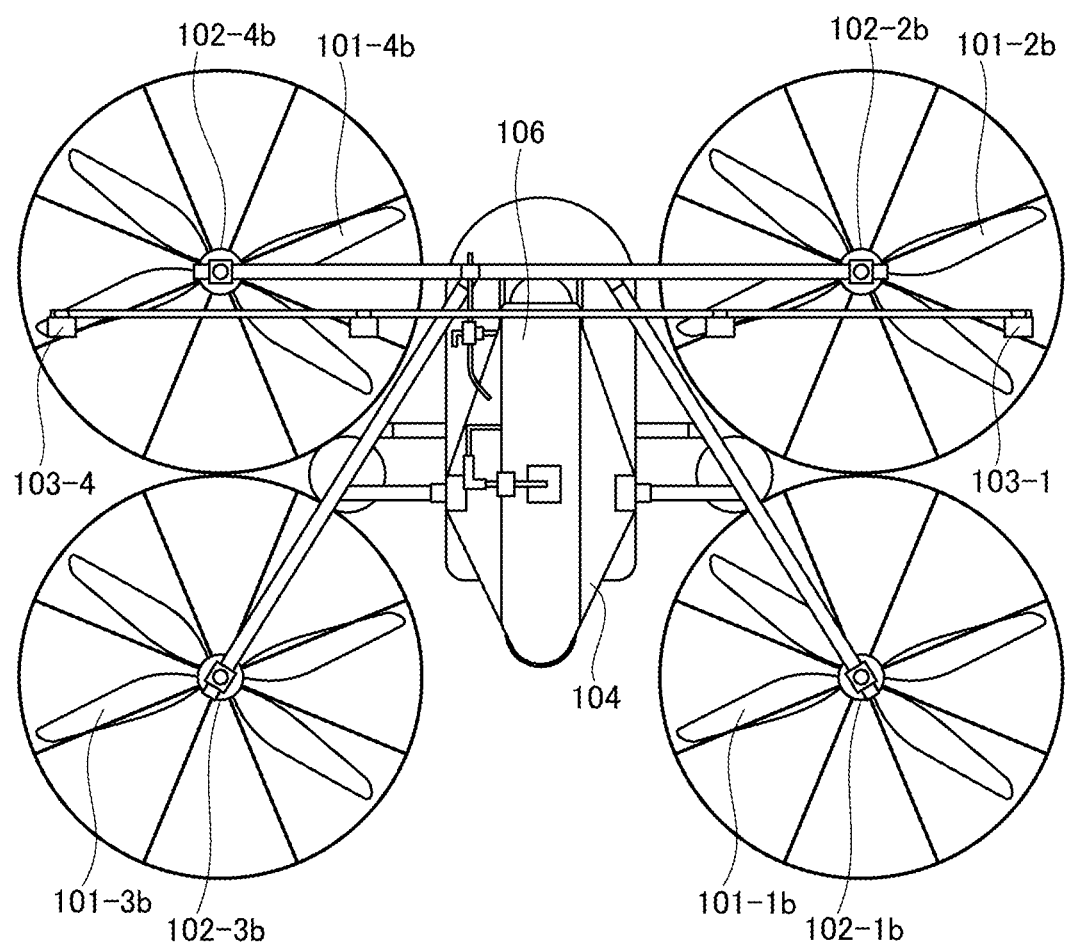
FIG. 4 is a rear view of the drone.
Figure 5:
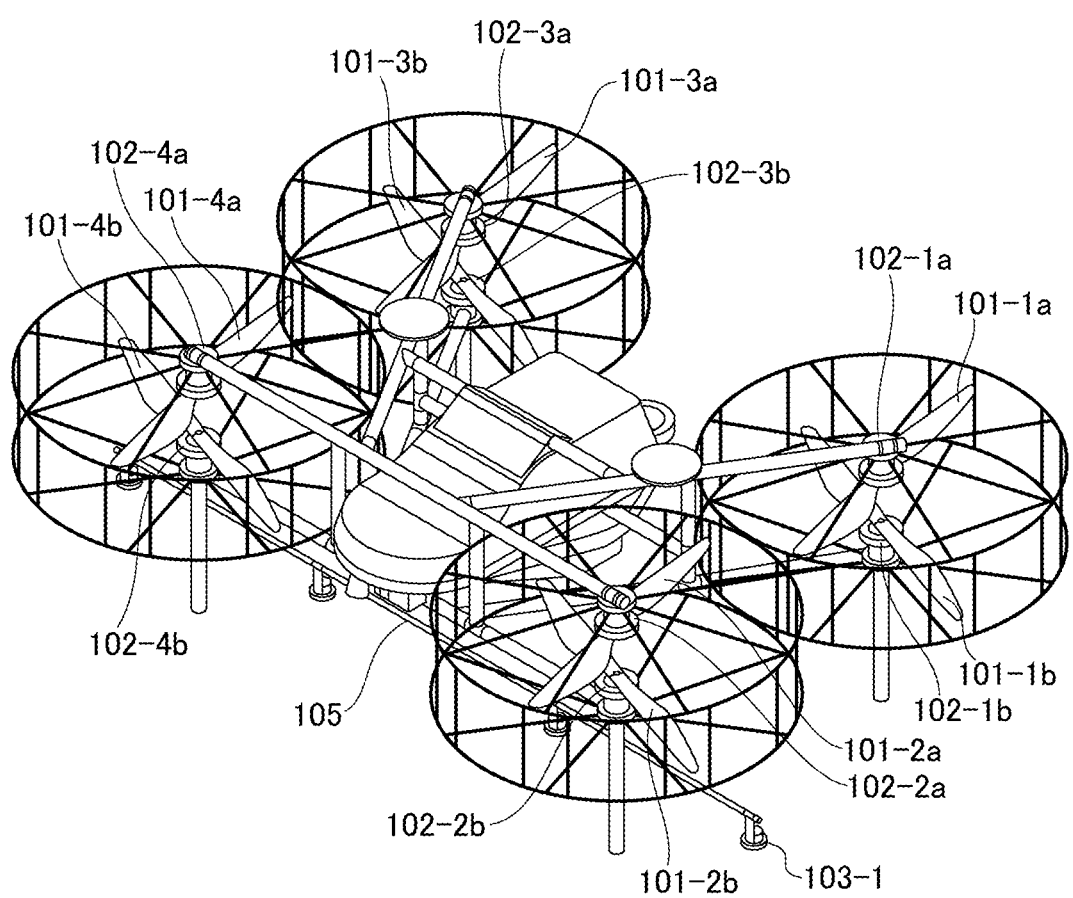
FIG. 5 is a perspective view of the drone.

Motors 102-1a, 102-1b, 102-2a, 102-2b, 102-3a, 102-3b, 102-4a, and 102-4b are means for causing the rotary wings 101-1a, 101-1b, 101-2a, 101-2b, 101-3a, 101-3b, 101-4a, and 101-4b to rotate (typically electric motors but may be engines, etc.), respectively, and are each provided for one rotary wing. The motors 102 exemplify thrusters. Up and down rotary wings of one of the sets (e.g., 101-1a and 101-1b) and their respective motors (e.g., 102-1a and 102-1b) include axes lying on the same line and rotate in directions opposite to each other for stability of flight of the drone and the like. As illustrated in FIG. 2 and FIG. 3, radial members for supporting propeller guards, which are provided to prevent the rotors from interfering with a foreign object, each have a turreted structure rather than a flat structure. This is because, in a case of a collision, this structure urges the member to buckle outward of the rotary wing, preventing the member from interfering with the rotor.

Chemical agent nozzles 103-1, 103-2, 103-3, and 103-4 are means for spreading chemical agent downward, and the number of the provided chemical agent nozzles is four. Note that, in the present specification, a chemical agent generally refers to liquid or powder to be spread over an agricultural field, such as agrochemical, herbicide, liquid fertilizer, insecticide, seeds, and water.

A chemical agent tank 104 is a tank for storing chemical agent to be spread and is provided at a position close to and below a center of gravity of the drone 100, from a viewpoint of weight balance. Chemical agent hoses 105-1, 105-2, 105-3, and 105-4 are means for connecting the chemical agent tank 104 and the chemical agent nozzles 103-1, 103-2, 103-3, and 103-4, are made of a hard material, and may additionally play a role of supporting the chemical agent nozzles. A pump 106 is means for discharging the chemical agent from the nozzles.

Figure 6:
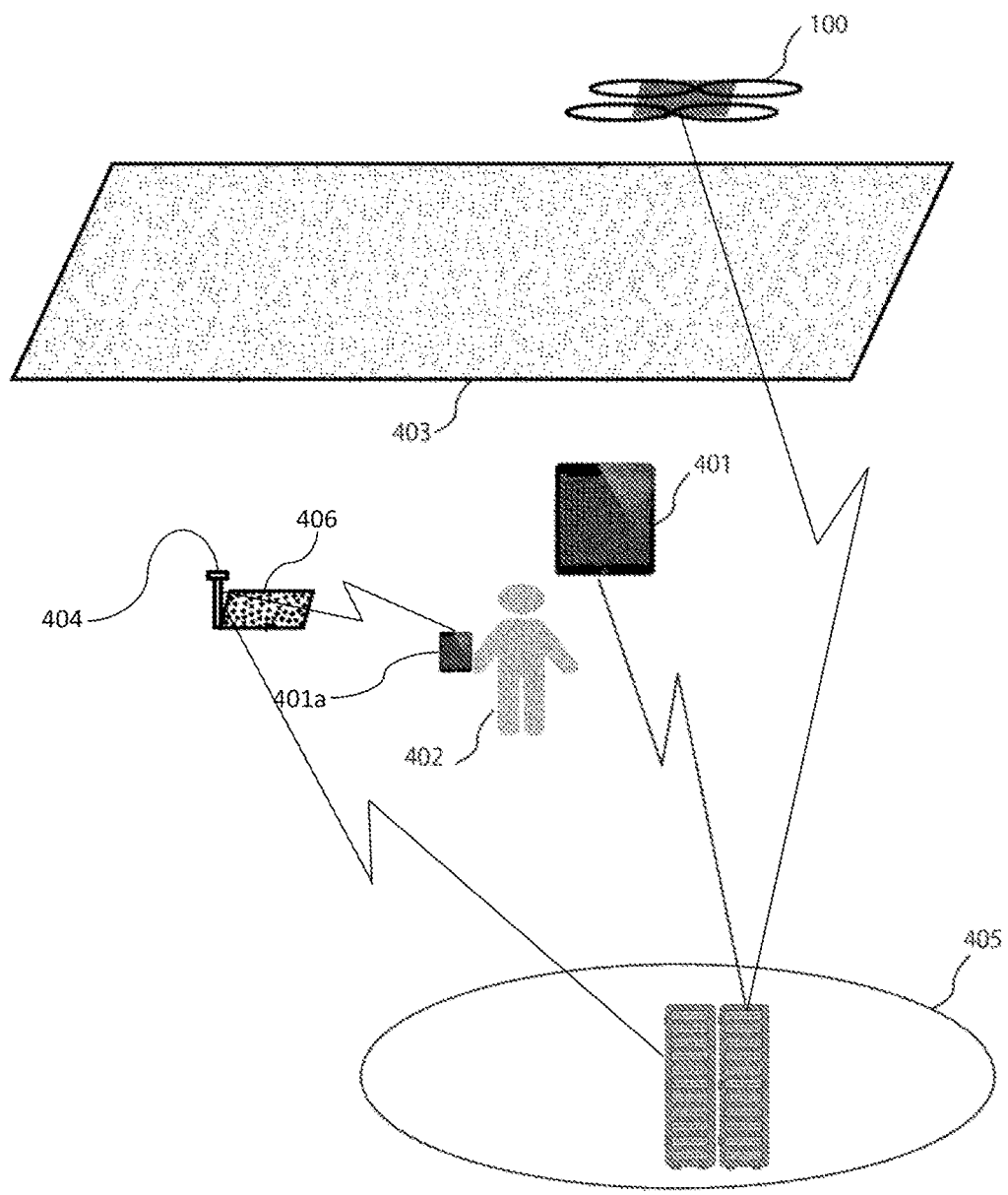
FIG. 6 is a general schematic diagram of the drone system.

FIG. 6 illustrates a general schematic diagram of a system to which an embodiment of the drone 100 according to the invention of the present application in chemical agent spreading use is applied. This figure is schematic, and its scale is not exact. In this figure, the drone 100, an operating device 401, a small portable terminal 401a, and a base station 404 are connected to an agriculture cloud 405. These constituents of the system may be connected by wireless communication such as Wi-Fi and a mobile telecommunications system, or some or all of them may be connected in a wired manner.

An operating device 401 is means for sending an instruction to the drone 100 in response to an operation made by a user 402 and for displaying information received from the drone 100 (e.g., position, amount of chemical agent, remaining battery level, image taken by a camera, etc.) and may be implemented in a form of mobile information equipment such as a typical tablet terminal on which a computer program runs. The drone 100 according to the invention of the present application is controlled so as to perform autonomous flight and may be configured to allow manual operation in basic operations such as a takeoff and a return and in an emergency situation. In addition to the mobile information equipment, an emergency operating device (not illustrated) having a dedicated function of making an emergency stop may be used. The emergency operating device may be dedicated equipment provided with a large emergency stop button or the like for dealing speedily with an emergency situation. Moreover, a small portable terminal 401a, such as a smartphone, capable of displaying some or all of pieces of information to be displayed on the operating device 401 may be included in the system in addition to the operating device 401. The system may have a function of changing behavior of the drone 100 based on information received from the small portable terminal 401a. The small portable terminal 401a is connected to, for example, the base station 404, and is capable of receiving information and the like from the agriculture cloud 405 via the base station 404.

An agricultural field 403 is a rice field, field, or the like that is to be spread with the chemical agent by the drone 100. In reality, topographic features of the agricultural field 403 are complex, and there may be no topographic map that is available in advance, or a given topographic map may disagree with site conditions of the agricultural field 403. Usually, the agricultural field 403 is adjacent to a house, hospital, school, agricultural field of another crop, road, railroad, or the like. In the agricultural field 403, an intruder such as a building, an electric wire, or the like may be present. The agricultural field is an example of a target area.

The base station 404 is a device providing a host unit function in Wi-Fi communication and the like and may be configured to function also as an RTK-GPS base station to provide an accurate position of the drone 100 (the host unit function in the Wi-Fi communication and the RTK-GPS base station may be implemented in independent devices). The base station 404 may be capable of communicating mutually with the agriculture cloud 405 using a mobile telecommunications system such as 3G, 4G, and LTE.

The agriculture cloud 405 typically includes computers and relevant software operated on a cloud computing service and may be wirelessly connected to the operating device 401 over a mobile telephone line or the like. Alternatively, the agriculture cloud 405 may be configured in a form of hardware such as a server apparatus connected to the drone 100 over a network. The agriculture cloud 405 may analyze images of the agricultural field 403 captured by the drone 100, grasp growth conditions of a crop, and perform processing for determining a flight route. In addition, the agriculture cloud 405 may provide topographic information and the like on the agricultural field 403 stored therein to the drone 100. Moreover, the agriculture cloud 405 may accumulate records of flights of the drone 100 and images captured by the drone 100 and perform various kinds of analyses thereon.

The small portable terminal 401a is, for example, a smartphone or the like. The small portable terminal 401a includes a display section that displays, as appropriate, information on an action predicted in relation to the operation of the drone 100, specifically, a scheduled time point at which the drone 100 is to return to a takeoff-landing point 406 and information on details of operations to be performed by the user 402 after the drone 100 returns. Based on an input performed on the small portable terminal 401a, behavior of the drone 100 may be changed. The small portable terminal 401a is capable of receiving information from the drone 100.

In general, the drone 100 takes off from the takeoff-landing point 406 located outside the agricultural field 403, spreads the chemical agent over the agricultural field 403, and returns to the takeoff-landing point 406 after the spreading or when replenishment with the chemical agent, electric recharging, or the like is needed. A flight route (entrance route) from the takeoff-landing point 406 to the agricultural field 403 as a destination may be stored in advance in the agriculture cloud 405 or the like or may be input by the user 402 before a takeoff.

Figure 7:
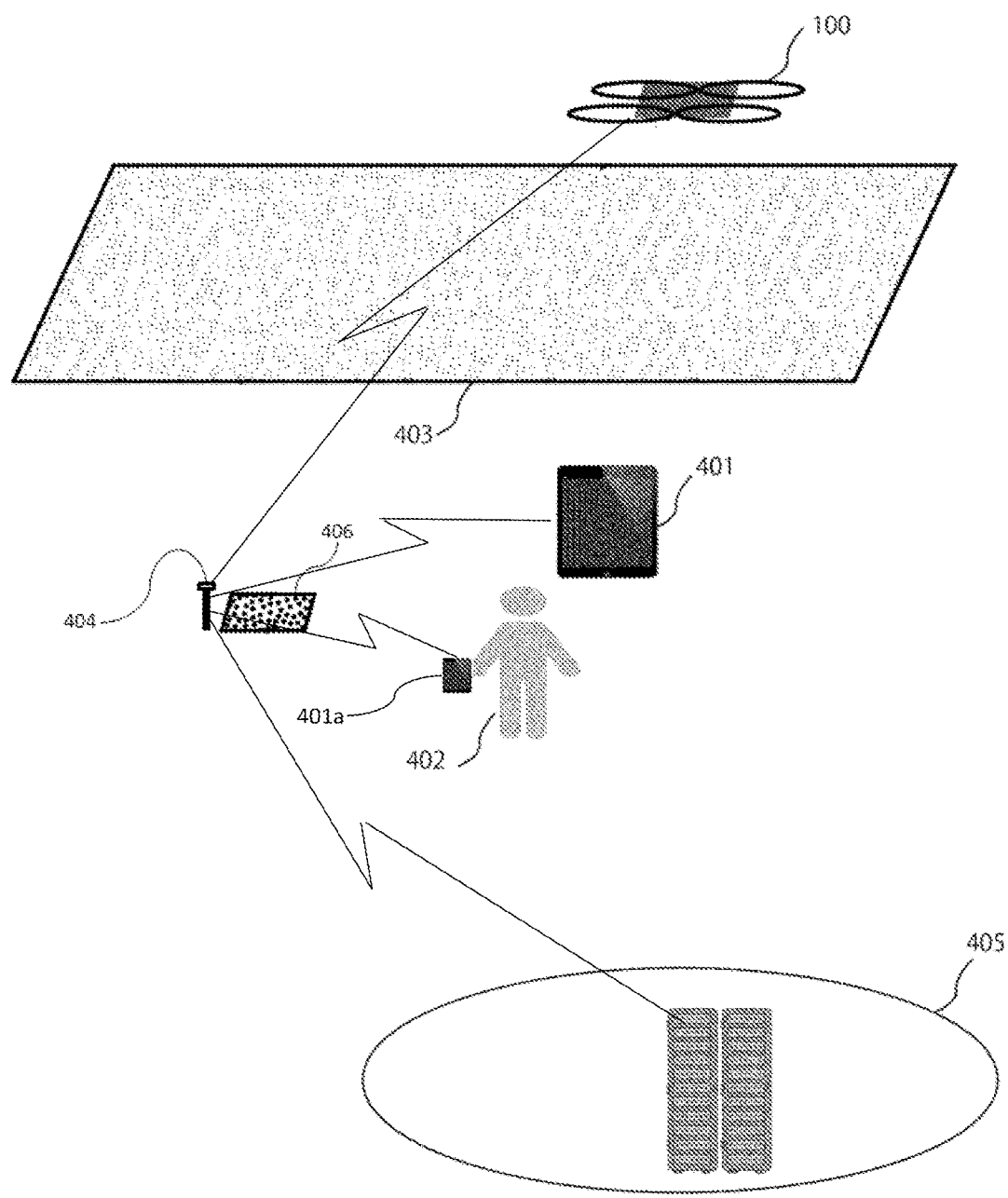
FIG. 7 is a general schematic diagram illustrating a second embodiment of the drone system.

Note that, as in a second embodiment illustrated in FIG. 7, a chemical-agent spreading system of the drone 100 according to the invention of the present application may have a configuration in which the drone 100, the operating device 401, the small portable terminal 401a, and the agriculture cloud 405 are connected to the base station 404.

Figure 8:
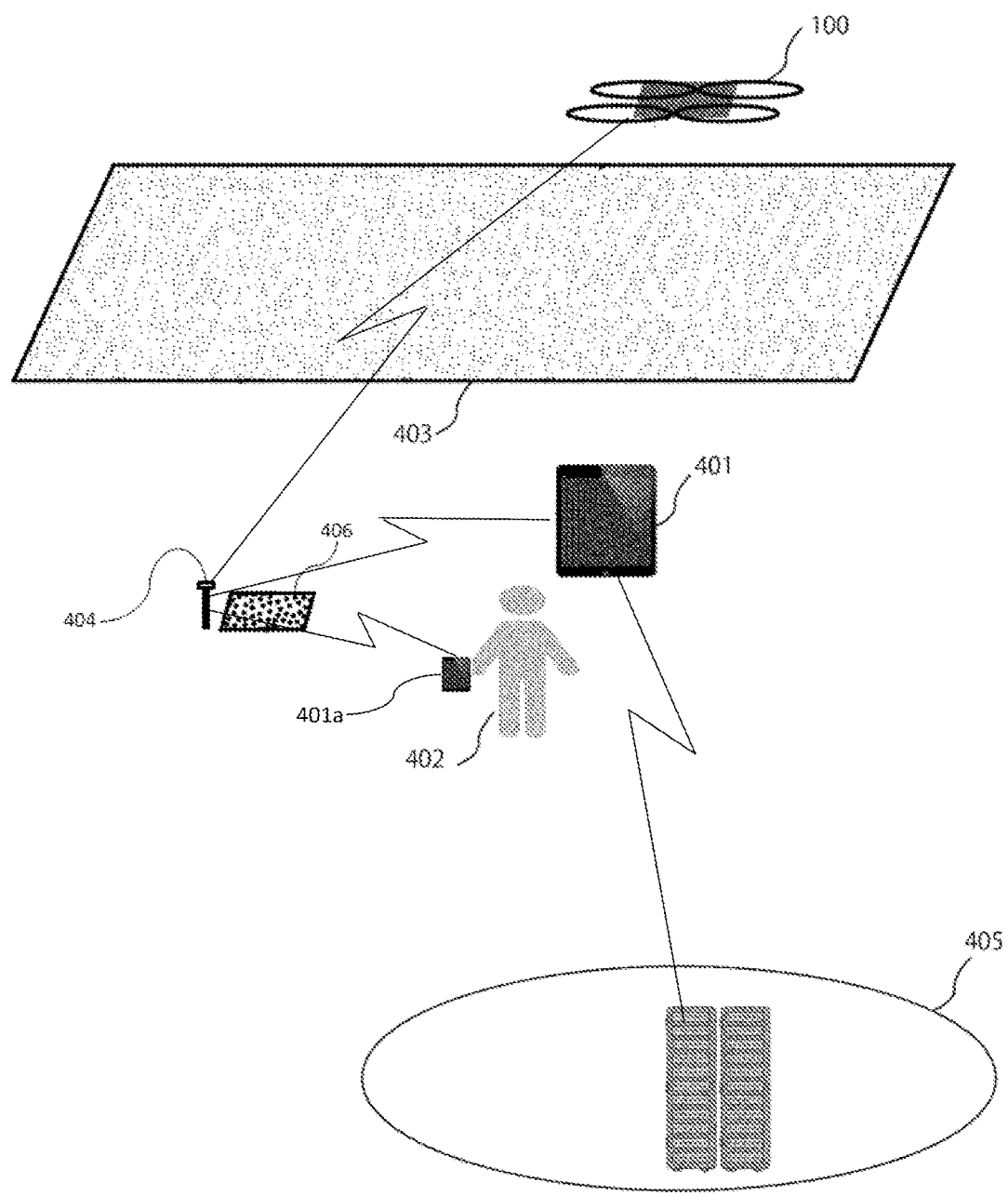
FIG. 8 is a general schematic diagram illustrating a third embodiment of the drone system.

Alternatively, as in a third embodiment illustrated in FIG. 8, the chemical-agent spreading system of the drone 100 according to the invention of the present application may have a configuration in which the drone 100, the operating device 401, and the small portable terminal 401a are connected to the base station 404, and only the operating device 401 is connected to the agriculture cloud 405.

Figure 9:
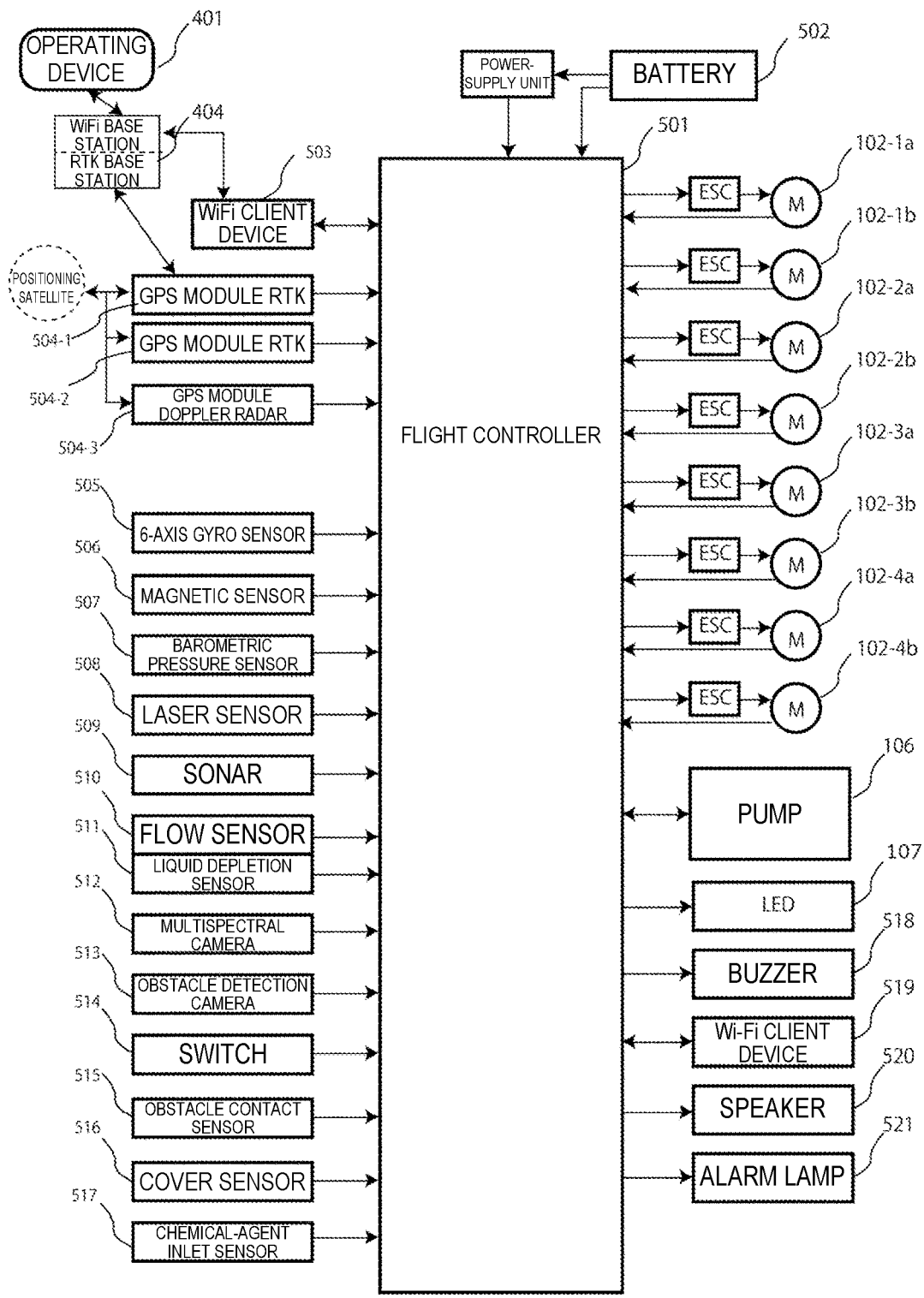
FIG. 9 is a schematic diagram illustrating control functions of the drone.

FIG. 9 is a block diagram illustrating control functions in an embodiment of a drone for spreading a chemical agent according to the invention of the present application. A flight controller 501 is a constituent component that governs control of the entire drone; specifically, the flight controller 501 may be an embedded computer including a CPU, a memory, relevant software, and the like. The flight controller 501 controls a flight of a drone 100 by controlling the numbers of revolutions of the motors 102-1a, 102-1b, 102-2a, 102-2b, 102-3a, 102-3b, 104-a, and 104-b via control means such as an electronic speed control (ESC) based on input information received from the operating device 401 and input information obtained from various kinds of sensors described later. The flight controller 501 is configured to receive feedback on the actual numbers of revolutions of the motors 102-1a, 102-1b, 102-2a, 102-2b, 102-3a, 102-3b, 104-a, and 104-b so as to monitor whether their rotations are normal. Alternatively, the flight controller 501 may be configured to receive feedback on the rotations of the rotary wings 101 from optical sensors or the like provided at the rotary wings 101.

Software used for the flight controller 501 can be rewritten for enhancement/modification of a function, fixing a problem, or the like via a storage medium or the like or communication means such as Wi-Fi communication and USB. In this case, the software is protected by means of encryption, checksum, digital signature, virus-check software, and the like so as not to be rewritten by fraudulent software. In addition, calculation processing used by the flight controller 501 for the control may be partly executed by another computer that is present on the operating device 401 or the agriculture cloud 405 or at another location. Some or all of the constituent components of the flight controller 501 may be duplexed owing to its great importance.

The flight controller 501 can receive a necessary instruction from the operating device 401 and send necessary information to the operating device 401 by exchanging data with the operating device 401 via a Wi-Fi client unit function 503 and additionally the base station 404. In this case, the communication may be encrypted to prevent fraudulent activities such as interception, spoofing, and hacking a device. The base station 404 has a communication function using Wi-Fi as well as a function of an RTK-GPS base station. By combining a signal from the RTK base station and signals from GPS satellites, an absolute position of the drone 100 can be measured with a precision of about several centimeters by the flight controller 501. The flight controller 501 may be duplexed/multiplexed owing to its great importance; in addition, redundant flight controllers 501 may be controlled to use another satellite so as to prepare for failure of some GPS satellite.

A 6-axis gyro sensor 505 is means for measuring accelerations of the drone airframe in three directions orthogonal to one another and further means for calculating velocities by integrating the accelerations. The 6-axis gyro sensor 505 is means for measuring changes in attitude angles, namely, angular velocities, of the drone airframe in the three directions described above. A geomagnetic sensor 506 is means for measuring a direction of the drone airframe by measuring the Earth's magnetic field. A barometric pressure sensor 507 is means for measuring barometric pressure; the barometric pressure sensor 507 can also measure an altitude of the drone indirectly. A laser sensor 508 is means for measuring a distance between the drone airframe and the Earth's surface by using reflection of laser light; the laser sensor 508 may use infrared (IR) laser. A sonar 509 is means for measuring a distance between the drone airframe and the Earth's surface by using reflection of a sound wave such as an ultrasonic wave. These sensors and the like may be selected in accordance with a cost target and performance requirements of the drone. In addition, a gyro sensor (angular velocity sensor) for measuring an inclination of the airframe, an anemometer sensor for measuring a force of wind, and the like may be added. These sensors and the like may be duplexed or multiplexed. In a case where there are a plurality of sensors provided for the same purpose, the flight controller 501 may use only one of the sensors, and if a failure occurs in the one, another one of the sensors may be switched to and used as an alternative sensor. Alternatively, the flight controller 501 may use the plurality of sensors simultaneously, and if measurement results from the sensors disagree, the flight controller 501 may deem that a failure has occurred.

Flow sensors 510 are means for measuring flow rates of chemical agent and are provided at a plurality of locations on channels from the chemical agent tank 104 to the chemical agent nozzles 103. A liquid depletion sensor 511 is a sensor for sensing whether a chemical agent amount has fallen to or below a predetermined amount. A multispectral camera 512 is means for capturing an image of the agricultural field 403 to acquire data to be used for image analysis. An obstacle detection camera 513 is a camera for detecting obstacles; the obstacle detection camera 513 is a device of a different kind from that of the multispectral camera 512 because its image properties and an orientation of its lens are different from those of the multispectral camera 512. A switch 514 is means with which the user 402 of the drone 100 makes various settings. An obstacle contact sensor 515 is a sensor for detecting that the drone 100, particularly a portion of its rotor or its propeller guard has come into contact with an intruder such as an electric wire, a building, a human body, a tree, a bird, and another drone. Note that the 6-axis gyro sensor 505 may substitute for the obstacle contact sensor 515. A cover sensor 516 is a sensor for detecting that a cover of an operation panel or a cover for an internal maintenance of the drone 100 is in an open state. A chemical-agent inlet sensor 517 is a sensor for detecting that an inlet of the chemical agent tank 104 is in an open state. These sensors and the like may be selected in accordance with a cost target and performance requirements of the drone and may be duplexed or multiplexed. In addition, a sensor may be provided in the base station 404, the operating device 401, or another location outside of the drone 100, and information read by the sensor may be sent to the drone. For example, an anemometer sensor may be provided in the base station 404, and information concerning a force and a direction of wind may be sent to the drone 100 via Wi-Fi communication.

The flight controller 501 sends a control signal to the pump 106 to adjust a chemical agent amount to be discharged or stop discharging the chemical agent. The flight controller 501 is configured to receive feedback on current conditions (e.g., the number of revolutions) of the pump 106.

An LED 107 is display means for informing an operator of the drone of a state of the drone. In place of or in addition to the LED, display means such as a liquid crystal display may be used. A buzzer 518 is output means for indicating the state (particularly an error state) of the drone using an aural signal. A Wi-Fi client unit function 519 is an optional constituent component that communicates with an external computer or the like to transfer, for example, software separately from the operating device 401. In place of or in addition to the Wi-Fi client unit function, other kinds of wireless communication means such as infrared communication, Bluetooth(R), ZigBee(R) and NFC, or wired communication means such as USB connection may be used. In place of the Wi-Fi client unit function, a mobile telecommunications system such as 3G, 4G, and LTE may be used to enable the drone and the external computer to mutually communicate with each other. A speaker 520 is output means for indicating the state (particularly an error state) of the drone using recorded human voice, synthesized voice, or the like. In some weather conditions, a visual display by the drone 100 during flight is difficult to see; in this case, using voice to convey the state is effective. An alarm lamp 521 is display means such as a strobe light for indicating the state (particularly an error state) of the drone. These kinds of input/output means may be selected in accordance with a cost target and performance requirements of the drone and may be duplexed or multiplexed.

Figure 10:
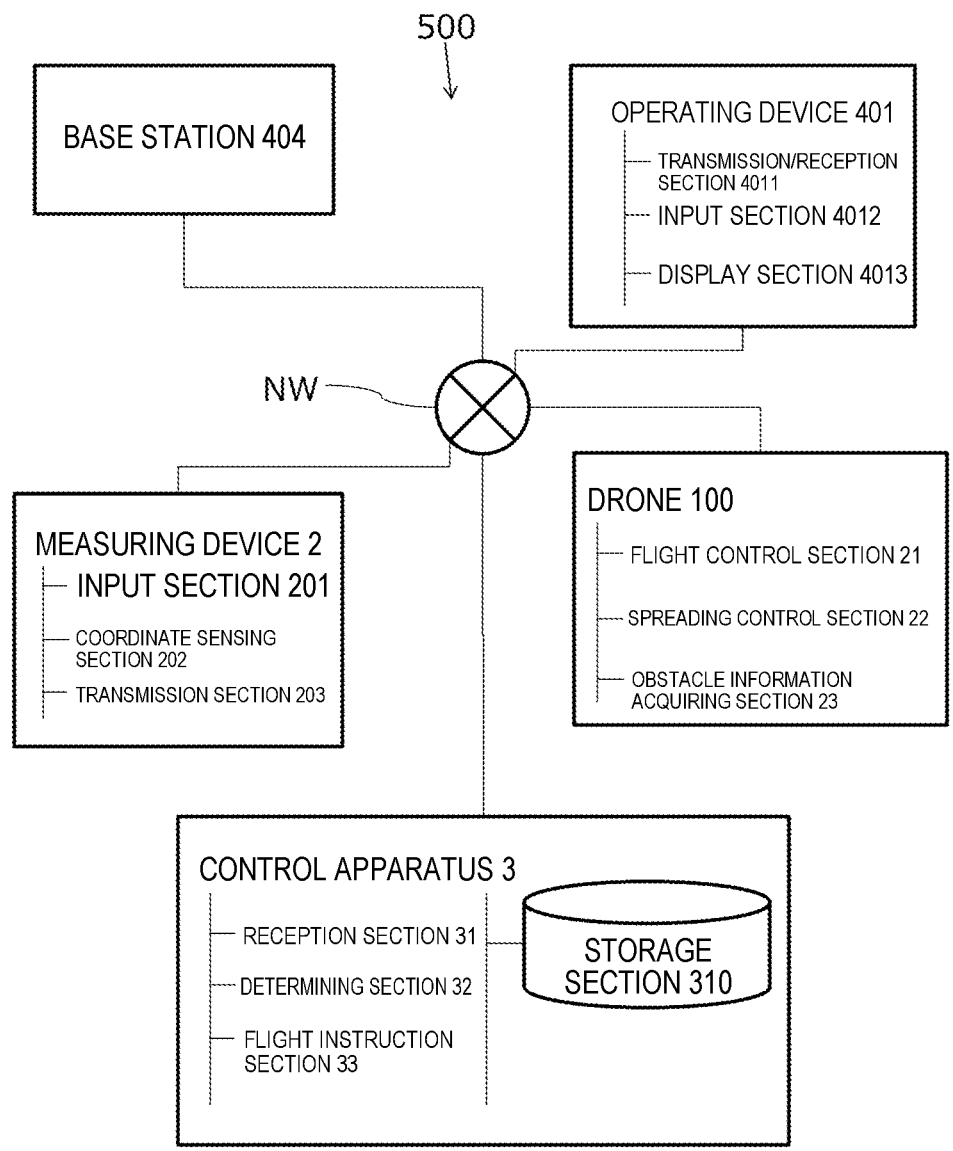
FIG. 10 is a functional block diagram concerning functions of a control apparatus according to the invention of the present application to control movement of a plurality of the drones.

As illustrated in FIG. 10, the operating device 401, an area information acquiring device 2, a control apparatus 3, the base station 404, and the drone 100 are connected to one another directly or indirectly, or over a network NW.

The operating device 401 includes a transmission/reception section 4011, an input section 4012, and a display section 4013. The transmission/reception section 4011 is a functional section that transmits/receives information to/from components of a drone system 500; the transmission/reception section 4011 is an example of a reception section. The input section 4012 is a functional section with which information on an operation plan for the drone 100 is input. Via the input section 4012, a user inputs identification information on the user, identification information on the drone to perform an operation, a purpose of a flight of the drone, and a type of chemical agent in a case where the drone is to perform chemical agent spreading. The display section 4013 has an appropriate configuration such as a liquid crystal display screen for transferring information to a user.

The area information acquiring device 2 is a functional section that acquires information on an operation area where the drone is to be caused to perform an operation. For example, the area information acquiring device 2 is a measuring device that acquires position coordinates of the operation area as the information on the operation area. In this case, the area information acquiring device 2 is a device having a function of an RTK-GPS mobile station and is capable of measuring an agricultural field to obtain coordinate information thereon. The area information acquiring device 2 is a small device that a user can carry about, such as a rod-shaped device. The area information acquiring device 2 may be a stick-shaped device that is long enough to allow a user in an upright posture to hold a top-end portion of the device while a bottom end of the device is in contact with the ground. The area information acquiring device 2 acquires position coordinates of an agricultural field where the drone 100 is to be caused to perform an operation.

The number of area information acquiring devices 2 available to read coordinate information on an agricultural field may be one or more. A configuration in which a plurality of area information acquiring devices 2 can be used to measure one agricultural field to obtain coordinate information thereon enables a plurality of users to carry about the respective area information acquiring devices 2 in the agricultural field, and thus an operation for the measurement can be completed in a short time.

In addition, the area information acquiring device is capable of measuring obstacles in or near an agricultural field to obtain information thereon. The obstacles include a wall, a slope, a utility pole, an electric wire, and the like that involves a risk of collision with the drone 100, and various kinds of objects that need not be spread with a chemical agent or monitored.

The area information acquiring device 2 includes an input section 201, a coordinate sensing section 202, and a transmission section 203.

The input section 201 is provided at a top-end portion of the area information acquiring device 2; for example, the input section 201 is a button that receives a press by a user. The user presses the button of the input section 201 when intending to measure coordinates of a bottom end of the area information acquiring device 2.

The input section 201 is configured to distinguish, when inputting the information, whether the input information concerns coordinates of an outer circumference of an agricultural field or coordinates of an outer circumference of an obstacle. In addition, the input section 201 can input coordinates of an outer circumference of an obstacle in conjunction with a type of the obstacle.

The coordinate sensing section 202 is a functional section capable of sensing three-dimensional coordinates of the bottom end of the area information acquiring device 2 by communicating with the base station 404 when necessary.

The transmission section 203 is a functional section that sends, in response to an input to the input section 201, three-dimensional coordinates of the bottom end of the area information acquiring device 2 at a time of the input, over the network NW to the operating device 401 or a traveling route generating device 1. The transmission section 203 sends the three-dimensional coordinates in an order of pointing.

In a process of reading coordinate information on an agricultural field, a user moves in the agricultural field, holding the area information acquiring device 2. First, sets of three-dimensional coordinates of the agricultural field are acquired. The user performs pointing with the input section 201 at endpoints or edges of the agricultural field. Next, the user performs pointing with the input section 201 at endpoints or edges of obstacles.

The sets of three-dimensional coordinates of the endpoints or edges of the agricultural field that are acquired by the pointing and sent are received by the traveling route generating device 1 while being subjected to distinction between three-dimensional coordinates of an outer circumference of the agricultural field and three-dimensional coordinates of an obstacle. In addition, the three-dimensional coordinates acquired by the pointing may be received by the transmission/reception section 4011 of the operating device 401 and displayed by the display section 4013 of the operating device 401. The operating device 401 may determine whether the received three-dimensional coordinates are appropriate as three-dimensional coordinates of the outer circumference of the agricultural field or the obstacles, and in a case where the determination is that remeasurement is needed, the operating device 401 may use the display section 4013 to prompt the user to perform the remeasurement.

In place of or in addition to the configuration, the area information acquiring device 2 may be a position coordinate acquiring device that is mounted in the drone 100 or the operating device 401 and acquires position coordinates of a vicinity of the operation area.

Drone

The drone 100 includes a flight control section 21, a spreading control section 22, and an obstacle information acquiring section 23. A plurality of drones 100 may be included in the drone system 500.

The flight control section 21 is a functional section that operates the motors 102 included in the drone 100 to control a flight, and a takeoff and a landing of the drone 100. The flight control section 21 is implemented as, for example, a function of the flight controller 501.

The spreading control section 22 is a functional section that spreads chemical agent from the chemical agent tank 104. The spreading control section 22 controls the chemical agent nozzles 103 and the pump 106 to spread the chemical agent downward of the drone 100.

The obstacle information acquiring section 23 is a functional section that acquires information on an agricultural field, a region around a boundary of the agricultural field, and a periphery of the agricultural field. The information includes information concerning the presence or absence of obstacles. The obstacle information acquiring section 23 is implemented in a form of, for example, some or all of the laser sensor 508, the sonar 509, the obstacle detection camera 513, and the obstacle contact sensor 515 illustrated in FIG. 10.

Control Apparatus

Functions of the control apparatus 3 may be implemented in the base station 404, may be implemented on the agriculture cloud 405, namely, in a server, or may be implemented in a separate device. Alternatively, the control apparatus 3 may be included in the drone 100. The control apparatus 3 includes a reception section 31, a storage section 310, a determining section 32, and a flight instruction section 33.

The reception section 31 is a functional section that receives an operation plan from the operating device 401. As illustrated in FIG. 11, the operation plan includes, for example, sets of three-dimensional coordinates of vertices of an operation area where an operation is to be performed, an operation type, manager information on a manager who provides instructions for the operation, and identification information on a drone 100 that is to be involved in the operation. The sets of coordinates of the operation area may be received from the area information acquiring device 2. The type of the operation may include whether a purpose of a flight of the drone 100 is to spread chemical agent or to monitor plant growth and may include a type of a chemical agent to be spread.

The storage section 310 is a functional section in which information on agricultural fields where the drone 100 can fly is stored in a form of a whitelist. Areas stored in a form of the whitelist, namely, registered areas, include a plurality of pieces of area information. An area filtering system using a whitelist enables only areas that have been checked for safety to be reliably managed, so that it is possible to block the drone 100 from entering dangerous areas almost perfectly.

As illustrated in FIG. 12(*a*), the storage section 310 stores information on agricultural fields where the drone 100 can fly, area types of the agricultural fields, manager information, and identification information on drones 100 supposed to be able to fly, in association with one another in the form of the whitelist. In the whitelist, abbreviated addresses and information on owners may be stored together.

The whitelist stored in the storage section 310 is formed based on data received from an external server. In addition, the storage section 310 is capable of updating the whitelist based on data received from the external server. For example, the external server provides the storage section 310 with information from Farmland Banks, which are set up in Japan's prefectures. From the information from the Farmland Banks, the storage section 310 extracts sets of coordinates of the agricultural fields and the manager information and reflects them in the whitelist.

The information on the agricultural fields registered in the whitelist includes, for example, sets of position coordinates of an outer circumference of each agricultural field, for example, sets of three-dimensional coordinates. The information on the agricultural fields is formed by means of acquisition by the same measuring method as that for a measuring device that is an embodiment of the area information acquiring device 2 using an RTK-GPS mobile station having the same precision as the area information acquiring device 2. That is, the whitelist is acquired and managed in a form of sets of three-dimensional coordinates of vertices. For agricultural drones that are also used by small-scale farmers, it is necessary to manage flight areas precisely in several centimeters particularly in a case of chemical agent spreading. With the configuration in which the area information acquiring device 2 acquires an operation area in a form of a set of three-dimensional coordinates of vertices and defines the operation area with the same precision as that of information specifying the whitelist, it is possible to manage an operation in an agricultural field precisely.

In addition, in the whitelist, identification information on a registered agricultural field and one representative point that represents the agricultural field are stored in association with each other. The representative point is a point that an operator who conducts registration for the whitelist specifies in the agricultural field. A representative point is used for identifying an agricultural field corresponding to an operation area. A procedure for identifying a corresponding agricultural field using a representative point will be described later.

The area type includes information concerning whether an agricultural field is a rice field or a field and concerning appropriateness of using agrochemical. The manager information is identification information on an owner of the agricultural field or a manager who performs an operation in the agricultural field. A plurality of pieces of manager information may be associated with one agricultural field. In addition, a plurality of drones may be associated with one piece of manager information. A table in which the manager information is associated with the identification information on the drone 100 may be managed separately from a table in which coordinates of an agricultural field are associated with an area type of the agricultural field.

The storage section 310 stores a time point at which the whitelist is updated. The storage section 310 may update the whitelist for each agricultural field and may be capable of storing an update time point for each item updated. The storage section 310 may store a date and time at which the whitelist is updated. The date and time includes a conception of date as well as a conception of date and time. When being referred to by the determining section 32, or periodically, the storage section 310 may refer to an updated date and time of data stored in the external server, and in a case where the updated date and time is different from an updated date and time of the whitelist stored in the storage section 310, the storage section 310 may update the whitelist.

As illustrated in FIG. 12(b), the storage section 310 may store one or more operation plans that are received from the area information acquiring device 2 or the operating device 401. In addition, the storage section 310 stores a time point at which an operation plan is stored for each operation area.

The determining section 32 is a functional section that determines feasibility of a flight of the drone 100 in an operation area based on the whitelist stored in the storage section 310. The determining section 32 determines whether to cause the drone 10 to perform an operation in accordance with whether an area corresponding to the operation area is identifiable from a plurality of pieces of area information registered in the whitelist as the registered area.

The determining section 32 compares position coordinates of an operation area that are acquired by the area information acquiring device 2 with position coordinates of an agricultural field registered in the whitelist. Position coordinates of an operation area are coordinates acquired at an actual agricultural field by a user, and thus when an agricultural field registered in the whitelist is specified, the specified agricultural field differs from the actual agricultural field in numeric values of coordinates. Thus, the determining section 32 determines whether an area specified as the operation area substantially corresponds to the agricultural field registered in the whitelist.

The determining section 32 determines an agricultural field that is closest to the operation area of agricultural fields stored in the whitelist (hereinafter, also referred to as a "corresponding agricultural field"). The determining section 32 specifies one predetermined point that is determined based on information on the operation area and selects the agricultural field in question as the corresponding agricultural field when a distance between the predetermined point and a representative point stored in the whitelist is within a predetermined value. In a case where there are a plurality of representative points that makes the distance be within the predetermined value, an agricultural field where a closest representative point is located may be determined as the corresponding agricultural field.

The determining section 32 may determine the predetermined point specified in the operation area to be, for example, a center of a polygon that is defined by connecting vertices of the operation area. The center of the polygon may be any one of the five centers of the polygon, for example, a centroid of the polygon.

A threshold value for the distance between the representative point and the predetermined point may be changed in accordance with an agricultural field where the representative point is located. For example, the threshold value may be determined in accordance with a length of a longest edge of an agricultural field where the representative point is located.

The determining section 32 determines an outer circumference of the operation area from the sets of coordinates of the operation area acquired by the area information acquiring device 2 and calculates an area of the operation area. In addition, the determining section 32 determines an area of the corresponding agricultural field. An area of each agricultural field stored in the whitelist may be calculated and stored in the storage section 310 in advance. In a case where an overlapping ratio between the operation area and the corresponding agricultural field is not less than a predetermined value, the determining section 32 determines that an area corresponding to the operation area is identifiable from the registered area and permits a flight of the drone 100 in the operation area.

In addition, the determining section 32 changes a threshold value for determining whether to perform an operation based on the overlapping ratio between the operation area and the corresponding agricultural field in accordance with the area of the corresponding agricultural field. When the area of the corresponding agricultural field is small, the determining section 32 adopts a large threshold value compared with that when the area of the corresponding agricultural field is large. In a case where the area of the corresponding agricultural field is small, a high overlapping ratio is calculated even when the operation area does not express an exact shape of the corresponding agricultural field. This becomes further prominent in a case of an irregular agricultural field, which is the corresponding agricultural field having a contour with many projections and depressions. By changing the threshold value in accordance with the area of the corresponding agricultural field, it is possible to determine a validity of the corresponding agricultural field more accurately.

In a case where a difference between the area of the operation area and the area of the corresponding agricultural field is within a predetermined value, the determining section 32 determines that an area corresponding to the operation area is identifiable from the registered area and permits an operation by the drone 100 in the operation area. With this configuration, it is possible to determine a validity of the corresponding agricultural field more accurately.

In a case where sets of position coordinates of a plurality of vertices included in an outer circumference of the operation area that demarcates the operation area are within a predetermined range from sets of position coordinates of vertices included in an outer circumference of the corresponding agricultural field, the determining section 32 determines that an area corresponding to the operation area is identifiable from the registered area and permits a flight of the drone in the operation area. For example, in a case where the operation area is polygonal, the determining section 32 specifies vertices of the corresponding agricultural field that are close to vertices of the operation area. The determining section 32 calculates distances to the vertices of the corresponding agricultural field for each vertex of the operation area, determines that the operation area is generally contained within the correspondence agricultural field, and permits a flight of the drone 100 in the operation area in terms of position coordinates of the operation area. Since the sets of coordinates acquired by the area information acquiring device 2 are sets of coordinates of endpoints or edges of the agricultural field, comparison between sets of endpoint coordinates of the operation area and sets of endpoint coordinates of the corresponding agricultural field enables accurate comparison of areas using numeric values close to those of original data.

Note that, even in a case where the number of vertices included in the outer circumference of the operation area is different from the number of vertices included in the outer circumference of the corresponding agricultural field, the determining section 32 specifies vertices of the corresponding agricultural field that are close to the vertices of the operation area, and when a set of position coordinates of each vertex of the operation area is within the predetermined range from sets of position coordinates of vertices included in the outer circumference of the corresponding agricultural field, the determining section 32 determines that an area corresponding to the operation area is identifiable from the registered area and permits an operation by the drone 100 in the operation area.

In a case where any one of the number of a plurality of edges, sets of position coordinates of the edges, angles of adjacent edges, and the number of vertices included in the outer circumference of the operation area that demarcates the operation area is within a predetermined range from corresponding one of the number of edges, sets of position coordinates of the edges, angles of adjacent edges, and the number of vertices included in an outer circumference of the corresponding agricultural field, the determining section may determine that an area corresponding to the operation area is identifiable from the registered area in terms of position coordinates of the operation area and permit the flight of the drone in the operation area.

The determining section 32 inhibits the operation by the drone 100 in the operation area in a case where an area corresponding to the operation area is unidentifiable from the agricultural fields registered in the whitelist stored in the storage section 310. In addition, in a case where the determining section 32 cannot identify an area corresponding to the operation area from the agricultural fields registered in the whitelist stored in the storage section 310, the operating device 401 may make a notification about information concerning a result of the determination.

In a case where a time point of acquisition of an operation plan stored in the storage section 310 is separated from a scheduled time point of flight of the drone by a predetermined value, the determining section 32 does not permit the flight of the drone 100. This is because, if the time point of acquisition of the operation plan is an old one, there is a risk that a shape of the agricultural field or information on the presence or absence of obstacles and the like is different from that at the scheduled time point of flight. In this case, the determining section 32 may promote a user to reset the operation plan, via the operating device 401. In addition, in a case where a date and time of acquisition of an agricultural field stored in the storage section 310 is separated from a date and time of starting the operation by the drone 100 by a predetermined value, the determining section 32 does not permit the operation by the drone 100.

When referring to the storage section 310, the determining section 32 compares the data from the external server with data in the storage section 310 to determine whether there is an update history. In a case where there is an update history, that is, in a case where the whitelist in the storage section 310 does not reflect latest data from the external server, the determining section 32 does not permit the flight of the drone 100. In addition, after not permitting the flight, the determining section 32 provides an indication for promoting an update of the whitelist, via the operating device 401. At this time, the determining section 32 notifies the operating device 401 of a result of the determination. The determining section 32 inhibits the flight of the drone 100 until updating the registered area registered in the whitelist is completed. In addition, the determining section 32 updates the registered area registered in the whitelist. After updating the registered area, the determining section 32 compares the operation area with the registered area to determine whether to perform the operation.

In a case where a time point of acquisition of the whitelist stored in the storage section 310 is separated from a scheduled time point of flight of the drone by a predetermined value, the determining section 32 may not permit the flight of the drone 100. In addition, after not permitting the flight, the determining section 32 provides an indication for promoting an update of the whitelist, via the operating device 401.

The information in the external server is not permanent and needs an update such as a building additionally built and a change of a boundary of an agricultural field accompanying pavement of a public road. If determination of feasibility of a flight is allowed while the whitelist is unupdated, there is a risk of a collision with an additionally-built building or a risk of operation out of an intended agricultural field. In addition, there is a concern about grown or increased trees. Moreover, utility poles may be additionally built. By determining feasibility of a flight based on the whitelist that reflects latest information, it is possible to perform an operation more safely and accurately.

The determining section 32 determines feasibility of a flight of the drone 100 in an agricultural field based on an arranged operation plan and an area type of the corresponding agricultural field. The determining section 32 determines an area type of the corresponding agricultural field, and when the area type fits an operation type of the drone, the determining section 32 permits a flight of the drone in an operation area. In a case of a drone for spreading chemical agent, it is necessary to spread a chemical agent that is appropriate for each agricultural field. Even though a flight is allowed in an area from the viewpoint of collision with an obstacle, spreading a chemical agent over an inappropriate agricultural field may kill a growing crop or may spoil an intended quality of, for example, a non-chemical vegetable or the like. With the configuration that feasibility of a flight is determined based on an area type of a corresponding agricultural field, it is possible to guarantee appropriate spreading of chemical agent.

The determining section 32 determines feasibility of a flight of the drone 100 in an agricultural field based on identification information on the drone 100 to perform the operation or information on a user who sends instructions for the operation and manager information on the agricultural field. If a drone is stolen or illicitly traded, there is a risk of causing illicit profits or using the drone in a usage other than originally intended. With this configuration, it is possible to prevent the drone 100 from being stolen or illicitly traded, so that the drone 100 can be used appropriately.

In addition, based on information acquired by the preliminary flight by the drone 100 to be described below, the determining section 32 may determine appropriateness of a flight for the operation (hereinafter, also referred to as "this flight").

The flight instruction section 33 is a functional section that sends instructions for a flight to the drone 100. In a case where the determining section 32 determines that a final update time point of the whitelist is separated from a scheduled time point of flight by a predetermined value, the flight instruction section 33 causes the drone 100 to perform a preliminary flight, of which flight is performed in a mode different from a mode of a flight in the operation.

The preliminary flight is a flight that is performed before a flight in an operation area to check whether to perform an operation in the operation area. The preliminary flight is an example of a preliminary movement. The preliminary flight is, for example, a flight over a boundary of the operation area. In particular, the preliminary flight may be a flight along the boundary of the operation area. On or near the boundary of the operation area, there is a high possibility of a change such as a building additionally built and a change in a boundary of an agricultural field, when compared with a central part of the agricultural field. Therefore, with this configuration, it is possible to efficiently check whether to perform an operation.

In the preliminary flight, the drone 100 flies while the obstacle information acquiring section 23 checks feasibility of a flight on a region around the boundary of the operation area. In the preliminary flight, the drone 100 may fly at a speed lower than a speed in an operation from the viewpoint of safety because the drone 100 flies on a route where whether to perform an operation has not been checked.

The preliminary flight may be a flight for acquiring information on a periphery of the operation area. In particular, in the preliminary flight, images of the entire periphery of the operation area may be captured with a camera to acquire information that enables determination of feasibility of this flight. At this time, the determining section 32 may compare the stored whitelist with the acquired information and may determine the feasibility of the flight for a spot having a difference from the whitelist.

Note that the preliminary flight or the preliminary movement may be performed by a drone other than the drone 100 to perform the operation or by another agricultural machine such as a tractor. The other drone is only required to perform the preliminary flight and not needed to perform the operation, and thus the other drone may be smaller than the drone 100 to perform.

Flowchart of Sending Operation Plan to Control Apparatus

As illustrated in FIG. 13, first, the area information acquiring device 2 acquires coordinates of an operation area and sends the coordinates to the operating device 401 (S1). Next, an operation type, manager information, and identification information on a drone are input into the operating device 401, associated with the coordinates of the operation area, and sent to the control apparatus 3 as an operation plan (S2). The operation plan is stored in the storage section 310 together with a date and time of acquisition (S3).

Figure 14:
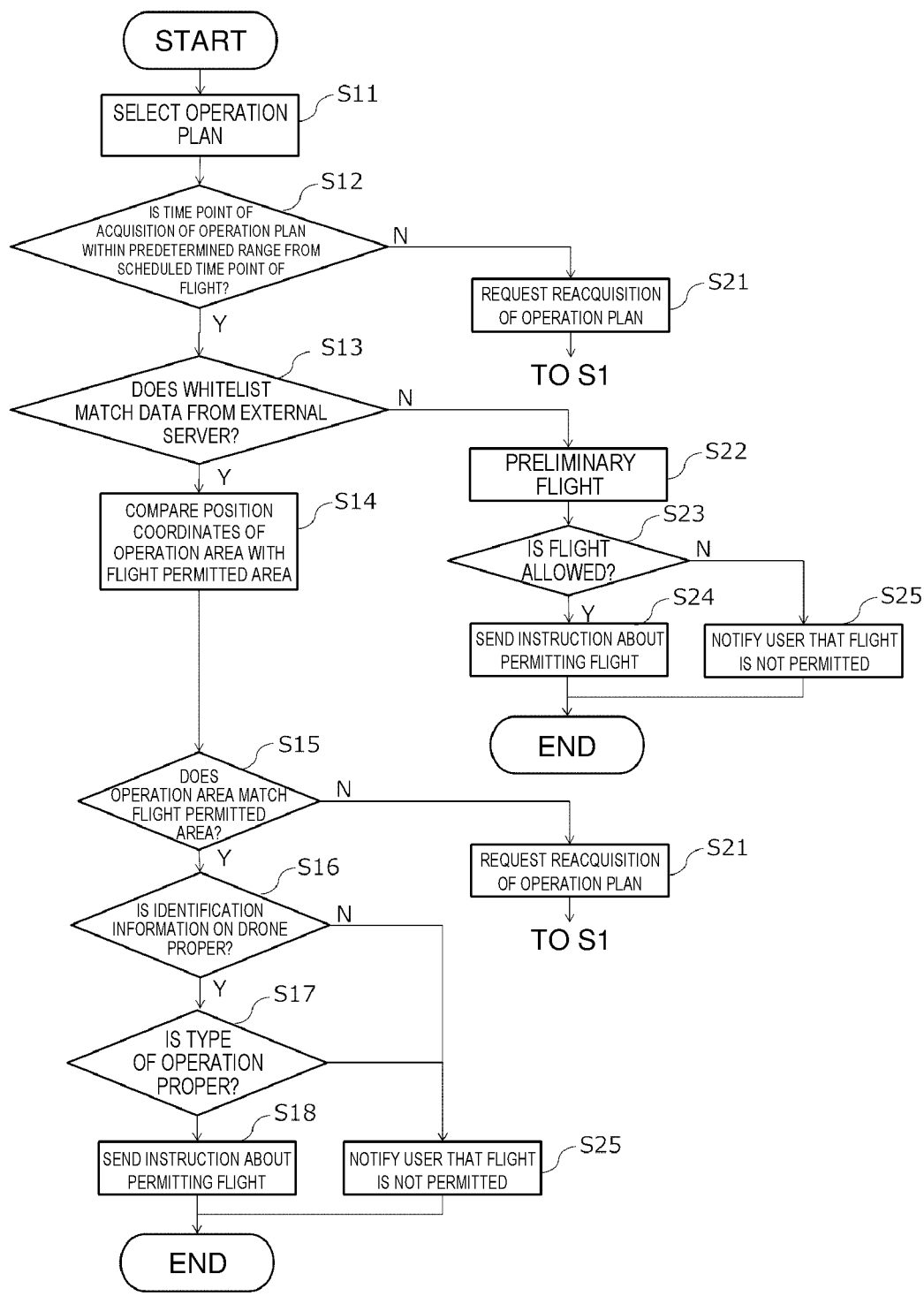
FIG. 14 is a flowchart of how the drone system determines whether to perform an operation based on an operation plan.

Flowchart of Control Apparatus Determining Whether to Perform Operation in Operation Area As illustrated in FIG. 14, first, when an operation plan is selected on the input section 4012 of the operating device 401 (S11), the operation plan is sent to the control apparatus 3. Next, whether a difference between a time point of acquisition of the operation plan and a scheduled time point of flight is within a predetermined range is determined (S12). In a case where the time point of acquisition of the operation plan is separated from the scheduled time point of flight by a predetermined value, the determining section 32 requests a user to reacquire an operation plan via the operating device 401 (S21), and the flow proceeds to step S1 illustrated in FIG. 14.

When the difference between the time point of acquisition of the operation plan and the scheduled time point of flight is within the predetermined range, the determining section 32 determines whether the whitelist stored in the storage section 310 matches the data from the external server (S13). Specifically, the determining section 32 checks for an update history after data on the whitelist in the external server. In a case where the whitelist does not match the data from the external server, and there is an update history, the flight instruction section 33 causes the drone 100 to perform a preliminary flight (S22).

Based on information acquired by the preliminary flight, the determining section 32 determines appropriateness of this flight (S23). In a case where the flight is determined to be feasible, the flight instruction section 33 sends an instruction about permitting the flight to the drone 100 (S24). In a case where the flight is determined to be not feasible, the control apparatus 3 notifies the user that the flight is not permitted, via the operating device 401 (S25). At this time, the control apparatus 3 may request the user to check the coordinates of the operation area or coordinates of an obstacle, via the operating device 401.

When the whitelist matches the data from the external server, the determining section 32 compares the position coordinates of the operation area with information on agricultural fields in the whitelist (S14). The determining section 32 determines whether the operation area substantially matches an agricultural field in the whitelist, and thus a corresponding agricultural field can be specified (S15). When the operation area substantially matches none of the agricultural fields in the whitelist, the determining section 32 requests the user to reacquire an operation plan via the operating device 401 (S21), and the flow proceeds to step S1 illustrated in FIG. 14.

When a corresponding agricultural field can be specified for the operation area, the determining section 32 determines whether identification information on the drone 100 included in the operation plan is proper (S16). Specifically, the determining section 32 determines whether the identification information on the drone 100 included in the operation plan matches identification information on a drone 100 that is associated with the corresponding agricultural field. In a case where the identification information on the drone 100 is not proper, the control apparatus 3 notifies the user that the flight is not permitted, via the operating device 401 (S25).

In a case where the identification information on the drone 100 is proper, the determining section 32 determines whether the operation type is proper (S17). Specifically, the determining section 32 determines whether the operation type included in the operation plan is feasible for an area type that is associated with the corresponding agricultural field. In a case where the operation type is not proper, the control apparatus 3 notifies the user that the flight is not permitted, via the operating device 401 (S25).

In a case where the operation type is proper, the flight instruction section 33 sends an instruction about permitting the flight to the drone 100 (S18).

Although the present description has been made about a drone for spreading an agricultural chemical agent as an example, note that a technical concept of the present invention is not limited to this example and is applicable to a system that determines whether to perform an operation by any automated machine for other uses such as photographing and monitoring.

Technically Advantageous Effect of the Invention of the Present Application

With the industrial machinery system according to the present invention, it is possible to guarantee a safe operation of an industrial machine.

The invention claimed is:

1. An industrial machinery system comprising:
an industrial machine;
an area information acquiring device that acquires information on an operation area where the industrial machine is to be caused to perform a predetermined operation; and
a control apparatus that determines whether to permit the industrial machine to perform the predetermined operation in the operation area, wherein
the control apparatus includes:

a storage section that stores information on a registered area; and a determining section that determines whether to permit the industrial machine to perform the predetermined operation in the operation area in accordance with whether an area corresponding to the operation area is identifiable from the registered area stored in the storage section, wherein the area information acquiring device acquires, as the information on the operation area, the position coordinates of the operation area and position coordinates of a vicinity of the operation area, wherein information on the registered area stored in the storage section includes position coordinates of the registered area, wherein the determining section compares the position coordinates of the operation area with the position coordinates of the registered area to identify an area corresponding to the operation area from the registered area, when determining that there is an area corresponding to the operation area in the registered area, the determining section permits the industrial machine to perform the predetermined operation, and when determining that there is no area corresponding to the operation area in the registered area, the determining section inhibits the industrial machine from performing the predetermined operation, wherein the storage section stores identification information on the registered area and a representative point that represents the registered area in association with each other, wherein the determining section specifies one predetermined point that is determined based on the information on the operation area and selects a registered area that minimizes a distance between the predetermined point and the representative point as the area corresponding to the operation area, wherein the predetermined point is a center of a polygon that is defined by connecting vertices of the operation area, and wherein a boundary of the operation area is determined by causing the industrial machine or another industrial machine to perform a preliminary movement along the boundary of the operation area to determine whether to permit the industrial machine to perform the predetermined operation in the operation area.

2. The industrial machinery system according to claim 1, wherein the determining section inhibits the industrial machine from performing the predetermined operation in the operation area in a case where an area corresponding to the operation area is unidentifiable from the registered area stored in the storage section.

3. The industrial machinery system according to claim 1, further comprising:

an operating device with which the industrial machine is operated, wherein in a case where the determining section determines that an area corresponding to the operation area is unidentifiable from the registered area stored in the storage section, the operating device makes a notification about information concerning a result of the determination.

4. The industrial machinery system according to claim 1, wherein the area information acquiring device is a measuring device that acquires, as the information on the operation area, the position coordinates of the operation area or the area information acquiring device is a position coordinate acquiring device that is mounted in the industrial machine or the operating device for the industrial machine.

5. The industrial machinery system according to claim 1, wherein the registered area stored in the storage section includes a plurality of pieces of area information, and the determining section identifies an area corresponding to the operation area from the plurality of pieces of area information stored as the registered area.

6. The industrial machinery system according to claim 1, wherein in a case where an overlapping ratio between the operation area and the registered area corresponding to the operation area is not less than a predetermined value, the determining section permits the industrial machine to perform the predetermined operation in the operation area.

7. The industrial machinery system according to claim 1, wherein in a case where a difference between an area of the operation area and an area of the registered area corresponding to the operation area is within a predetermined value, the determining section permits the operation by the industrial machine in the operation area.

8. The industrial machinery system according to claim 7, wherein the determining section changes a threshold value for determining whether to permit the industrial machine to perform the predetermined operation based on an overlapping ratio between the operation area and the registered area corresponding to the operation area, in accordance with the area of the registered area corresponding to the operation area.

9. The industrial machinery system according to claim 1, wherein in a case where sets of position coordinates of a plurality of vertices included in an outer circumference of the operation area that demarcates the operation area are within a predetermined range from a set of position coordinates of a vertex included in an outer circumference of an area corresponding to the operation area, the determining section permits the industrial machine to perform the predetermined operation in the operation area.

10. The industrial machinery system according to claim 1, wherein in a case where any one of the number of a plurality of edges, sets of position coordinates of the edges, angles of adjacent edges, and the number of vertices included in the outer circumference of the operation area that demarcates the operation area is within a predetermined range from corresponding one of the number of edges, sets of position coordinates of the edges, angles of adjacent edges, and the number of vertices included in an outer circumference of an area corresponding to the operation area, the determining section permits the industrial machine to perform the predetermined operation in the operation area.

11. The industrial machinery system according to claim 1, wherein the control apparatus further includes a reception section that receives a purpose of the predetermined operation, the storage section stores identification information on the registered area and a feasible operation type that is associated with the identification information on the registered area, and the determining section permits the industrial machine to perform the predetermined operation in the operation area in a case where an operation type of the industrial machine received by the reception section matches an operation type that is feasible in the registered area corresponding to the operation area.

12. The industrial machinery system according to claim 1, wherein
the control apparatus further includes a reception section that receives identification information on the industrial machine,
the storage section stores identification information on the area and identification information on the industrial machine that is associated with the identification information on the registered area and determined to be operable, and
the determining section permits the industrial machine to perform the predetermined operation in the operation area in a case where the identification information on the industrial machine received by the reception section matches identification information on an industrial machine that is operable in the registered area corresponding to the operation area.

13. The industrial machinery system according to claim 1, wherein the storage section is capable of updating the registered area based on data received from an external server and compares the data from the external server with the registered area stored in the storage section to determine whether there is an update history, and in a case where the update history is present, the storage section inhibits the industrial machine from performing the predetermined operation until updating the registered area is completed, updates the registered area, or notifies the operating device for the industrial machine of a result of the determination.

14. The industrial machinery system according to claim 1, wherein
the storage section stores a date and time of acquisition of information on an area corresponding to the operation area, and
in a case where a date and time of acquisition of information on the operation area stored in the storage section is separated from a date and time of start of the predetermined operation by the industrial machine by a predetermined value, the determining section does not permit the industrial machine to perform the predetermined operation.

15. The industrial machinery system according to claim 1, wherein
the storage section stores a date and time of acquisition of information on the operation area, and
in a case where a date and time of acquisition of the operation area is separated from a date and time of flight of the industrial machine by a predetermined value, the determining section does not permit the industrial machine to perform the predetermined operation or may notify a user.

16. An industrial machinery system comprising:
an industrial machine that performs a predetermined operation in a predetermined operation area; and
a control apparatus that determines whether to permit the industrial machine to perform the predetermined operation in the operation area, wherein
the control apparatus includes:
a storage section that stores information on a registered area; and
a determining section that determines whether to permit the industrial machine to perform the predetermined operation in the operation area by comparing information on the operation area acquired by the industrial machine or another industrial machine performing a preliminary movement of which movement is performed in a mode different from a mode of the predetermined operation with information on the registered area stored in the storage section,
wherein the industrial machinery system acquires, as the information on the operation area, the position coordinates of the operation area and position coordinates of a vicinity of the operation area,
wherein information on the registered area stored in the storage section includes position coordinates of the registered area,
wherein the determining section compares the position coordinates of the operation area with the position coordinates of the registered area to identify an area corresponding to the operation area from the registered area, when determining that there is an area corresponding to the operation area in the registered area, the determining section permits the industrial machine to perform the predetermined operation, and when determining that there is no area corresponding to the operation area in the registered area, the determining section inhibits the industrial machine from performing the predetermined operation,
wherein the storage section stores identification information on the registered area and a representative point that represents the registered area in association with each other,
wherein the determining section specifies one predetermined point that is determined based on the information on the operation area and selects a registered area that minimizes a distance between the predetermined point and the representative point as the area corresponding to the operation area,
wherein the predetermined point is a center of a polygon that is defined by connecting vertices of the operation area, and
wherein a boundary of the operation area is determined by causing the industrial machine or the other industrial machine to perform the preliminary movement along the boundary of the operation area to determine whether to permit the industrial machine to perform the predetermined operation in the operation area.

17. The industrial machinery system according to claim 16, wherein in the preliminary movement, the industrial machine checks for an obstacle in the operation area.

18. The industrial machinery system according to claim 16, wherein
information on a periphery of the operation area is acquired by the preliminary movement of the industrial machine, and
the determining section checks for an obstacle based on the information acquired by the preliminary movement.

19. The industrial machinery system according to claim 16, wherein in the preliminary movement, the industrial machine moves at a speed lower than a speed at which the industrial machine moves in performing the predetermined operation.

20. The industrial machinery system according to claim 1, wherein the industrial machine is a drone.

21. The industrial machinery system according to claim 1, wherein the industrial machine is an agricultural machine.

22. A control apparatus that is capable of being communicatively connected to
an industrial machine, and
an area information acquiring device that acquires information on an operation area where the industrial machine is to be caused to perform a predetermined operation, the control apparatus comprising:
- a storage section that stores information on a registered area; and
- a determining section that determines whether to permit the industrial machine to perform the predetermined operation in the operation area in accordance with whether an area corresponding to the operation area is identifiable from the registered area stored in the storage section, wherein the area information acquiring device acquires, as the information on the operation area, the position coordinates of the operation area and position coordinates of a vicinity of the operation area, wherein information on the registered area stored in the storage section includes position coordinates of the registered area, wherein the determining section compares the position coordinates of the operation area with the position coordinates of the registered area to identify an area corresponding to the operation area from the registered area, when determining that there is an area corresponding to the operation area in the registered area, the determining section permits the industrial machine to perform the predetermined operation, and when determining that there is no area corresponding to the operation area in the registered area, the determining section inhibits the industrial machine from performing the predetermined operation, wherein the storage section stores identification information on the registered area and a representative point that represents the registered area in association with each other, wherein the determining section specifies one predetermined point that is determined based on the information on the operation area and selects a registered area that minimizes a distance between the predetermined point and the representative point as the area corresponding to the operation area, wherein the predetermined point is a center of a polygon that is defined by connecting vertices of the operation area, and wherein a boundary of the operation area is determined by causing the industrial machine or another industrial machine to perform a preliminary movement along the boundary of the operation area to determine whether to permit the industrial machine to perform the predetermined operation in the operation area.

* * * * *